July 7, 1970  J. L. SOMNITZ  3,519,301
ENERGY ABSORBING VEHICLE BUMPER ASSEMBLY
Filed April 10, 1968
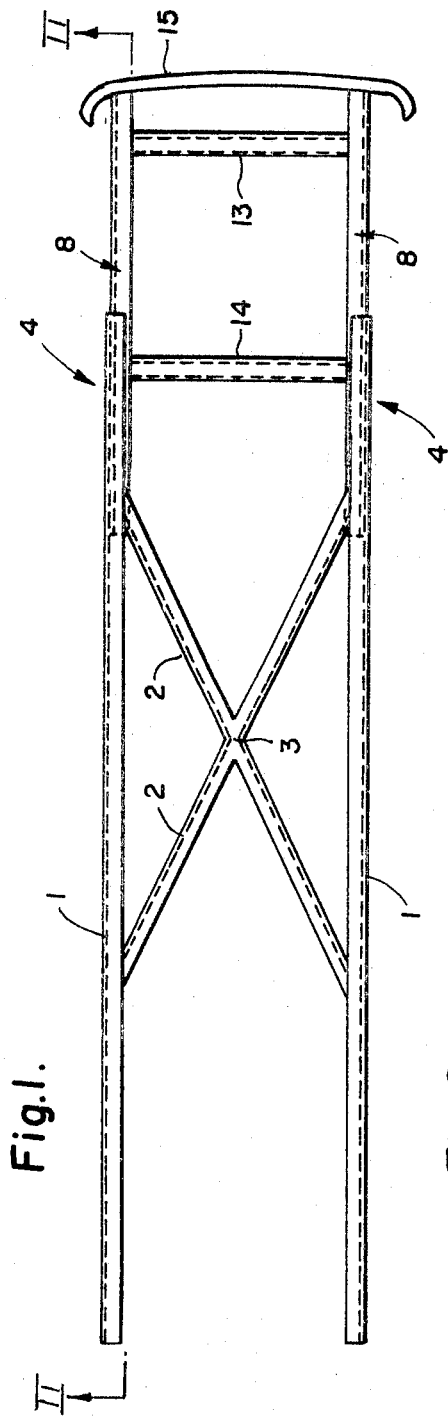
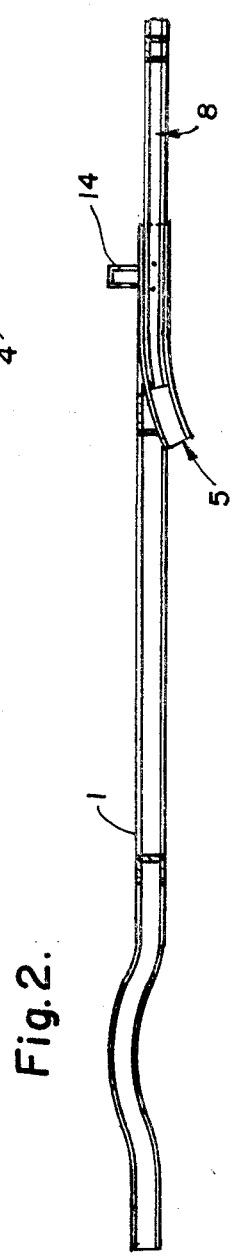
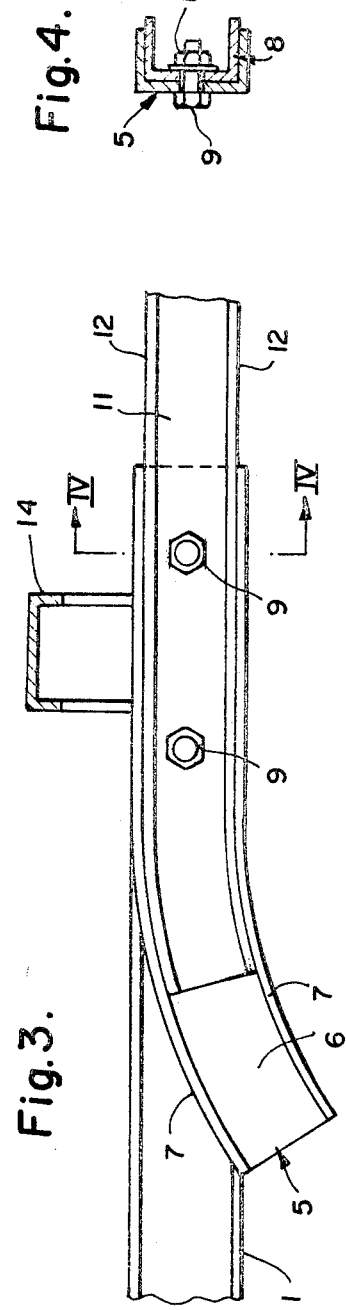
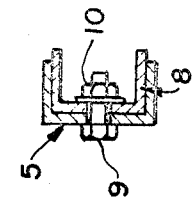
INVENTOR.
JAMES L. SOMNITZ
BY
his ATTORNEY

United States Patent Office 3,519,301
Patented July 7, 1970

3,519,301
ENERGY ABSORBING VEHICLE
BUMPER ASSEMBLY
James L. Somnitz, Parma, Ohio, assignor to Jones & Laughlin Steel Corporation, Pittsburgh, Pa., a corporation of Pennsylvania
Filed Apr. 10, 1968, Ser. No. 720,066
Int. Cl. B60r *19/02;* B61f *19/04;* B61g *11/06*
U.S. Cl. 293—1
4 Claims

ABSTRACT OF THE DISCLOSURE

An energy absorbing mechanism comprising a substantially rectilinear impact member and a curvilinear reaction member, so positioned with relation to one another that an impact force delivered to the impact member forces the latter to slide along the reaction member bending as it moves so as to assume the configuration of the reaction member. The energy of the impact force is thus exhausted in deforming the impact member.

---

This invention relates generally to mechanism for absorbing the energy of impact forces and more particularly to the application of such mechanisms to automotive vehicles for absorbing the shock of collision forces to minimize personal injuries to occupants of the vehicle.

The present invention provides for an energy absorbing mechanism comprising a substantially rectilinear impact member and a curvilinear reaction member. One end of the impact member is slidably positioned adjacent said reaction member and cooperates therewith so that an impact force applied to the end of impact member remote from the reaction member forces the impact member to slide along the reaction member and deform, taking on the curvilinear shape of the reaction member. The deformation of the impact member thus acts to absorb the impact force. Shearable means are employed to secure the impact member and reaction member together so that a portion of the impact force is spent initially in cutting through said shearable means.

The energy absorbing mechanism is applied to automotive vehicles and acts to absorb the shock of a collision in a manner as to lessen the likelihood of injury to occupants of the vehicles. When so used, the impact receiving end of the impact member is secured to the vehicle bumper and the reaction member to the vehicle frame so that the two members are free to move relative to one another.

An object of the invention is to provide a mechanism for absorbing impact forces. Another object of the invention is to provide such a mechanism where deformation of a rigid metal member acts to absorb the forces. A further object of the invention is to provide such a mechanism on an automotive vehicle whereby the likelihood of injury to occupants of the vehicle upon collision is materially lessened.

These and other objects and advantages of the invention will be readily understood from the following description of an embodiment of the invention with reference to the drawings, wherein:

FIG. 1 is a plan view illustrating the application of the energy absorbing mechanism to an automtive vehicle frame.

FIG. 2 is a sectional view taken on line II—II of FIG. 1.

FIG. 3 is a side elevational fragmentary view of the structure of FIG. 1 showing the energy absorbing mechanism in greater detail.

FIG. 4 is a sectional view taken on line IV—IV of FIG. 3.

Referring now to FIG. 1, there is shown a steel vehicle frame having side rails 1—1 joined together by cross braces 2—2. The cross braces are secured together at 3. At the forward ends of the side rails are the energy absorbing mechanism designated generally 4—4. Since they are identical, only one is described herein.

An absorbing mechanism includes a curvilinear reaction member 5 mounted to a side rail 1 as by welding and a substantially rectilinear impact member 8. The reaction member is channel-shaped and has a base portion 6 and flanges 7—7 extending perpendicularly from said base. The rearmost portion of the reaction member curves downwardly away from the side rail 1 while the frontmost portion extends substantially coaxially with the side rail.

Impact member 8 is also channel-shaped and includes a base 11 and flanges 12—12. The impact dissipating end of impact member 8 is slidably received within the confines of flanges 7—7 of reaction member 5 and is secured to base 6 through its base 11 by way of shearable means such as shear bolts 9—9 made fast by nuts 10—10. A cross brace 13 is fixed to the impact members 8—8 near their forward ends and a transmission support member 14 is fixed to said impact members rearwardly of brace 13. Impact members 8—8 in cooperation with brace 13 and support 14 serve as the front wheel and motor mounting assembly of the vehicle. Secured to the front end of the impact members is vehicle bumper 15.

The delivery of a force to bumper 15 is transmitted through impact members 8—8 to shear bolts 9—9, and when the force exceeds some predetermined minimum, as for example the force resulting from a relatively violent collision, the bolts will be sheared as the impact members 8—8 move backwardly relative to the reaction members 5—5. As the bolts are sheared a certain amount of the impact force is dissipated. Any remaining force forces the impact members to slide along the reaction members, and as this occurs the impact dissipating end of the impact members is deformed to the configuration of the curvilinear reaction member. The impact force is exhausted as the impact dissipating end of the impact members is so deformed whereby the effect of the impact force on the occupants of the vehicle is materially lessened.

It is to be understood that various changes and modifications may be made in the embodiment of the invention illustrated and described without departing from the spirit and scope of the invention as defined in the following claims.

I claim:

1. An energy absorbing mechanism comprising a substantially rectilinear impact member having an impact receiving end and an impact dissipating end, a curvilinear reaction member slidably receiving the impact dissipating end of said impact member and cooperating therewith so that application of a predetermined minimum force to the impact receiving end of said impact member forces the latter to slide along the reaction member bending as it moves so as to be deformed and assume the configuration of the reaction member and exhaust the energy of said force.

2. The mechanism of claim 1 including shearable means securing said impact member at its impact dissipating end to said reaction member.

3. The mechanism of claim 2 wherein said impact member is secured to a vehicle bumper at its impact receiving end.

4. The combination of claim 3 wherein said reaction member is secured to the vehicle frame.

References Cited

UNITED STATES PATENTS

| | | | |
|---|---|---|---|
| 2,135,749 | 11/1938 | Gullo | 267—1 |
| 2,837,176 | 6/1958 | Dropkin | 293—89 X |
| 3,006,484 | 10/1961 | Pringiers | 213—220 |
| 3,138,118 | 6/1964 | Dean | 105—392.5 |
| 3,146,014 | 8/1964 | Kroell | 293—70 |

ARTHUR L. LA POINT, Primary Examiner

H. BELTRAM, Assistant Examiner

U.S. Cl. X.R.

105—392.5; 213—220; 267—139; 293—63, 70, 89